Dec. 30, 1930. K. RÖDER 1,787,263
STEAM TURBINE
Filed Dec. 16, 1927
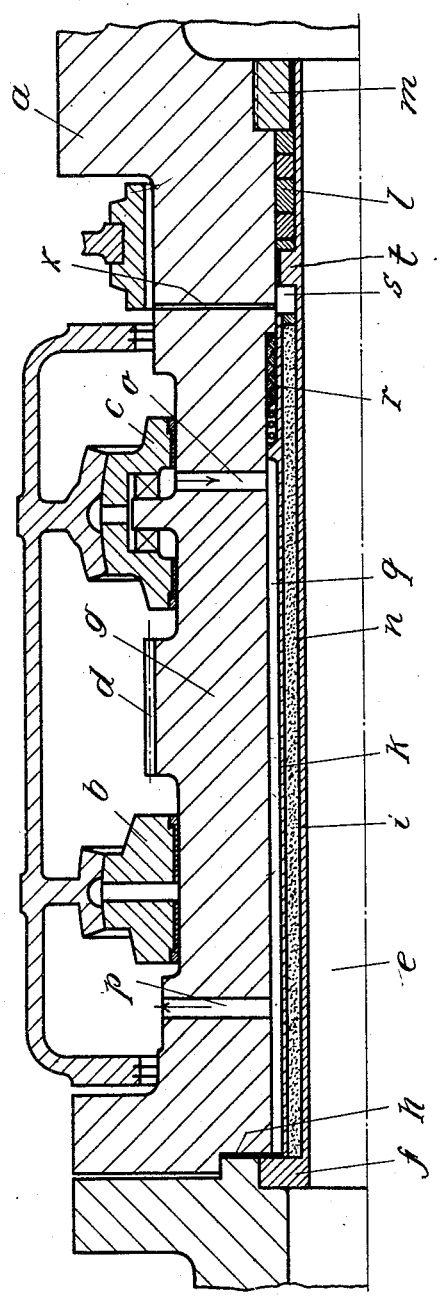
Inventor
Karl Röder
by Knight Bro
Attorneys Patented Dec. 30, 1930

1,787,263

UNITED STATES PATENT OFFICE

KARL RÖDER, OF HANOVER, GERMANY

STEAM TURBINE

Application filed December 16, 1927, Serial No. 240,506, and in Germany December 18, 1926.

My invention relates to steam turbines.

There are turbines in which the introduction of the driving medium through the bore of the shaft presents particular advantages. Such an arrangement is, for instance, suitable for turbines with two rotors which revolve in opposite directions. The supply of the live driving medium then takes place through the bores of one or both of the rotors. The transmission of heat from the driving medium to the rotor must then be taken into account, which does not only involve a loss of energy, but might be detrimental to those parts of the rotor which must be lubricated, such as the bearings and the pinion.

According to my invention the supply members for the driving medium are so designed that not only a detrimental transmission of heat is avoided, but that even the heat from the shaft may be dissipated through its bore. For this purpose two concentric tubes are introduced into the bore of the shaft in such a manner that besides the central tubular portion of full circular cross-section two further spaces of annular cross-section are produced. The central circular portion serves for the supply of the driving medium, such as high pressure steam. The annular space which surrounds this center directly is filled with a heat insulating material or a bad conductor of heat, such as infusorial earth, and is put in communication with the outside by fine radial bores in the shaft. The outer annular chamber is for the length of the portion of the shaft cooled by the forced oil supply, usually employed for the general lubrication of the engine, in such a manner that this outer annular chamber is constantly traversed by oil under pressure during the running of the turbine. In this way is effected not only a vigorous discharge of the heat transferred from the live driving medium in spite of the heat insulating substance, but the cooling of the bearing and the driving pinion is promoted and the usual heat dissipation at the surface of the pinion and the journals is assisted.

An embodiment of my invention is illustrated in the drawing affixed hereto and forming part of my specification, this drawing showing the pertaining shaft and bearing portion in longitudinal central section.

Referring to the drawing, $a$ is one of the two parts of the shaft journaled in the supporting bearings $b$ and $c$, the latter being designed as thrust bearing. On the shaft is also provided a pinion $d$ the place of which may also be taken by the carrier of the runner blades of a medium or low pressure turbine or the revolving portion of a dynamo. Through the interior $e$ of the inner tube $i$ is introduced the driving medium, for instance, high-pressure steam. The flange $f$ of the tube is separated from the shaft portion $g$ to be kept cool, by a plate $h$ made of a bad conductor of heat, for instance asbestos-cement. The inner tube $i$ is sealed against the shaft $a$ by a stuffing box $l$ whose material is compressed by gland $m$. As packing material for the stuffing box $l$ is employed a resilient material which permits axial expansion of the tube $i$ in relation to the shaft $a$. The tube $i$ is surrounded by an outer tube $k$ and the annular space $n$ between the tubes $i$ and $k$ is filled with a resilient heat insulating material such as powdered infusorial earth. The annular space $q$ between the outer tube $k$ and the boring wall of the shaft section $g$ to be kept cool is at one end in communication with the forced oil system of the engine by bore $o$ and at the other end by bore $p$ in communication with the oil discharge system, so that this annular space $q$ is effectively flushed with cold oil. In this way not only the passage of heat from the steam into the body of the shaft $g$ is prevented, but the heat dissipation from the journals is also assisted so that the bearings may be subjected to a higher load. The outer tube $k$ is sealed against the shaft $a$ by a stuffing box $r$ which also permits of axial motion between the two parts. The annular space $s$ left between the end of tube $k$ and the shoulder $t$ of stuffing box $l$ is preferably in communication with the outside by fine bores $x$ in the shaft in order to provide an outlet for any leakage fluid, either steam or oil.

The flow of the oil through the annular space $q$ is preferably assisted by making the diameter of the shaft at the place where the oil inlet $o$ is located smaller than at the place where the oil issues through the bore $p$. The pumping action induced by greater centrifugal force at the mouth of bore $p$ may, furthermore, be improved by not giving the bores $o$ and $p$ an accurately radial direction. Preferably the bore $o$ for the admission of the oil is so placed that it has a scooping action while the outlet bore $p$ is so located that it has the tendency to fling the oil.

Various modifications and changes may be made without departing from the spirit and the scope of the invention, and I desire, therefore, that only such limitations shall be placed thereon as are imposed by the prior art.

I claim as my invention:—

1. A hollow rotatable shaft serving as a hot pressure fluid conduit and having a central hot pressure fluid conducting pipe of suitable diameter to form an annular chamber between the pipe and the inner shaft wall, to prevent heat from flowing from the pipe to the shaft, and means for circulating cooling fluid through said chamber.

2. A hollow rotatable shaft serving as a steam conduit and having a central steam conducting pipe and a pipe surrounding said central pipe, said pipes forming two concentric annular chambers surrounding the central portion of said steam pipe, heat insulating material disposed in the inner of said annular chambers, means for supplying oil and means for putting the outer of said annular chambers in communication with said oil supply.

3. A hollow rotatable shaft serving as a steam conduit and having a central steam conducting pipe and a pipe surrounding said central pipe, said pipes forming two concentric annular chambers surrounding the central portion of said steam pipe, heat insulating material disposed in the inner of said annular chambers, means for supplying oil and means for putting the outer of said annular chambers in communication with said oil supply, and a leakage chamber adapted to receive leakage fluid from both annular chambers, and means for draining said leakage chamber to the outside.

4. A hollow rotatable shaft serving as a steam conduit and having a central steam conducting pipe and a pipe surrounding said central pipe, said pipes forming two concentric annular chambers surrounding the central portion of said steam pipe, heat insulating material disposed in the inner of said annular chambers, means for supplying oil, said shaft having a bore for connecting said outer chamber with the oil supply and a bore for discharging the oil from said chamber.

5. A hollow rotatable shaft serving as a steam conduit and having a central steam conducting pipe and a pipe surrounding said central pipe, said pipes forming two concentric annular chambers surrounding the central portion of said steam pipe, heat insulating material disposed in the inner of said annular chambers, means for supplying oil, said shaft having a bore for connecting said outer chamber with the oil supply and a bore for discharging the oil from said chamber, the mouth of said second bore being located a greater radial distance from the shaft center than the mouth of the oil supply bore for furthering the oil circulation through said chamber.

6. A hollow rotatable shaft serving as a steam conduit and having a central steam conducting pipe and a pipe surrounding said central pipe, said pipes forming two concentric annular chambers surrounding the central portion of said steam pipe, heat insulating material disposed in the inner of said annular chambers, means for supplying oil, said shaft having a bore for connecting said outer chamber with the oil supply and a bore for discharging the oil from said chamber, the mouth of said second bore being located a greater radial distance from the shaft center than the mouth of the oil supply bore, said oil supply bore deviating from the radial direction towards the direction of shaft rotation, said oil discharge bore deviating in the opposite direction for furthering the oil circulation through said chamber.

In testimony whereof I affix my signature.

KARL RÖDER.